United States Patent [19]

Hill

[11] Patent Number: 5,097,755
[45] Date of Patent: Mar. 24, 1992

[54] METHOD AND APPARATUS FOR PROCESSING PRODUCE

[75] Inventor: Brian Hill, Buffalo Grove, Ill.

[73] Assignee: Redi-Cut Foods, Inc., Rosemont, Ill.

[21] Appl. No.: 394,957

[22] Filed: Aug. 17, 1989

[51] Int. Cl.⁵ .................. A23L 1/212; F26B 19/00
[52] U.S. Cl. .................. 99/484; 34/69; 99/484; 99/517; 99/536; 426/518
[58] Field of Search .......... 99/517, 536, 537, 635, 99/636, 637, 643, 484, 567; 426/419, 518, 524, 484; 53/167, 515, 390, 391, 127, 440, 435; 34/10, 33, 34, 69, 71, 90, 236, 92; 15/3.1, 3.11, 3.12, 3.13, 3.14, 3.15, 3.16, 306 B; 198/346; 62/64, 322, 331, 443, 441

[56] References Cited

U.S. PATENT DOCUMENTS

| | | | |
|---|---|---|---|
| 1,055,353 | 3/1913 | Plummer | 99/517 X |
| 1,961,337 | 6/1934 | Cornell | 99/517 X |
| 1,991,324 | 2/1935 | Keech | 34/71 |
| 2,264,461 | 12/1941 | Steves | 198/346 |
| 2,526,063 | 10/1950 | Booth | 62/441 X |
| 2,666,711 | 1/1954 | Crosset | 15/3.13 X |
| 2,719,529 | 10/1955 | Wells | 15/3.13 X |
| 2,978,333 | 4/1961 | Teigen | 426/419 |
| 3,353,577 | 11/1967 | Bruel et al. | 99/484 |
| 3,423,950 | 1/1969 | Reynolds | 62/64 X |
| 3,461,680 | 8/1969 | Rische | 426/524 X |
| 3,587,203 | 6/1971 | Miles | 99/484 X |
| 3,831,389 | 8/1974 | Lipona | 426/524 X |
| 4,001,443 | 1/1977 | Dave | 426/419 X |
| 4,126,945 | 11/1978 | Manser et al. | 34/10 X |
| 4,168,597 | 9/1979 | Cayton | 53/127 |
| 4,321,863 | 3/1982 | Dimov et al. | 99/517 X |
| 4,401,020 | 8/1983 | Brux | 99/635 X |
| 4,549,478 | 10/1985 | Entes | 15/3.12 X |
| 4,777,734 | 10/1988 | Elferink | 34/34 |

FOREIGN PATENT DOCUMENTS 290488 4/1953 Switzerland .................. 15/3.13

Primary Examiner—Harvey C. Hornsby
Assistant Examiner—Scott J. Haugland
Attorney, Agent, or Firm—Niro, Scavone, Haller & Niro

[57] ABSTRACT

A method and apparatus are disclosed for processing produce and particularly fresh vegetables for salads. The vegetables are stored in an area near the beginning of the process line, and the storage area is partitioned by vinyl strips to create a temperature gradient for different vegetables. The vegetables are first cleaned on mesh conveyors under high pressure nozzles that spray chlorinated water at the desired storage temperature of the vegetables. A trimming table includes a lower conveyor for moving the vegetables for hand processing. An upper, cleated conveyor carries the vegetables to a slicer. Another cleated conveyor lifts the sliced vegetables vertically into a hopper where they are mixed with cooling water that then flows through a significant horizontal length of pipe. The vegetables move to shaker tables that provide the bulk of the dewatering and then vibrate the vegetables into a single layer for air drying. The air drying is provided by air knives and a vacuum that draws water through the cotton belt on which the vegetables travel. Additional drying is provided by a fluidizing bed with a perforated belt of different sized holes, and then the vegetables move to a vibratory table for packing.

26 Claims, 6 Drawing Sheets

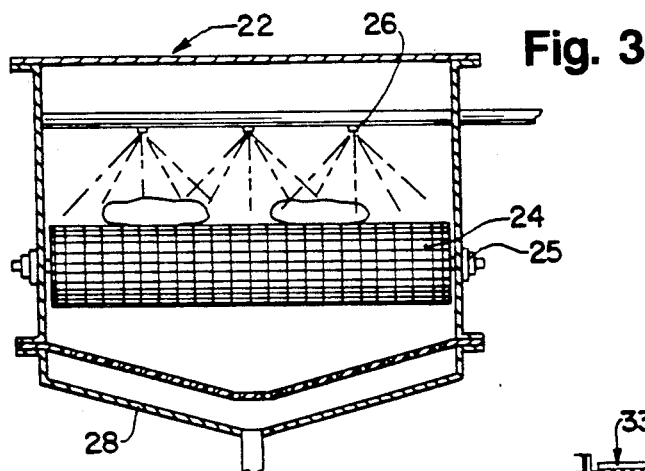
Fig. 3
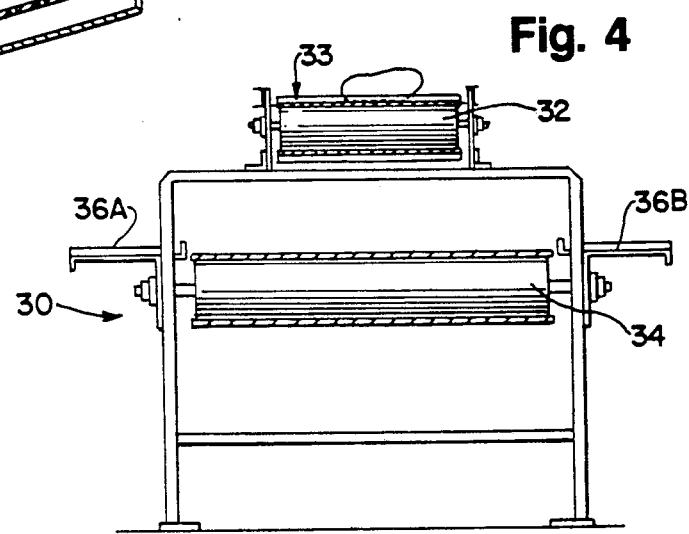
Fig. 4
Fig. 5
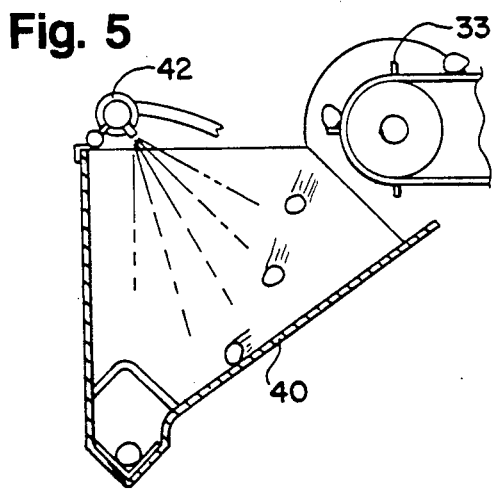
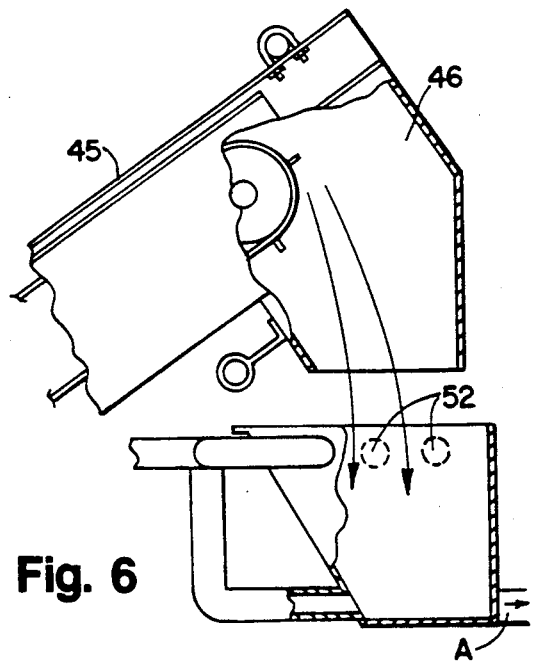
Fig. 6

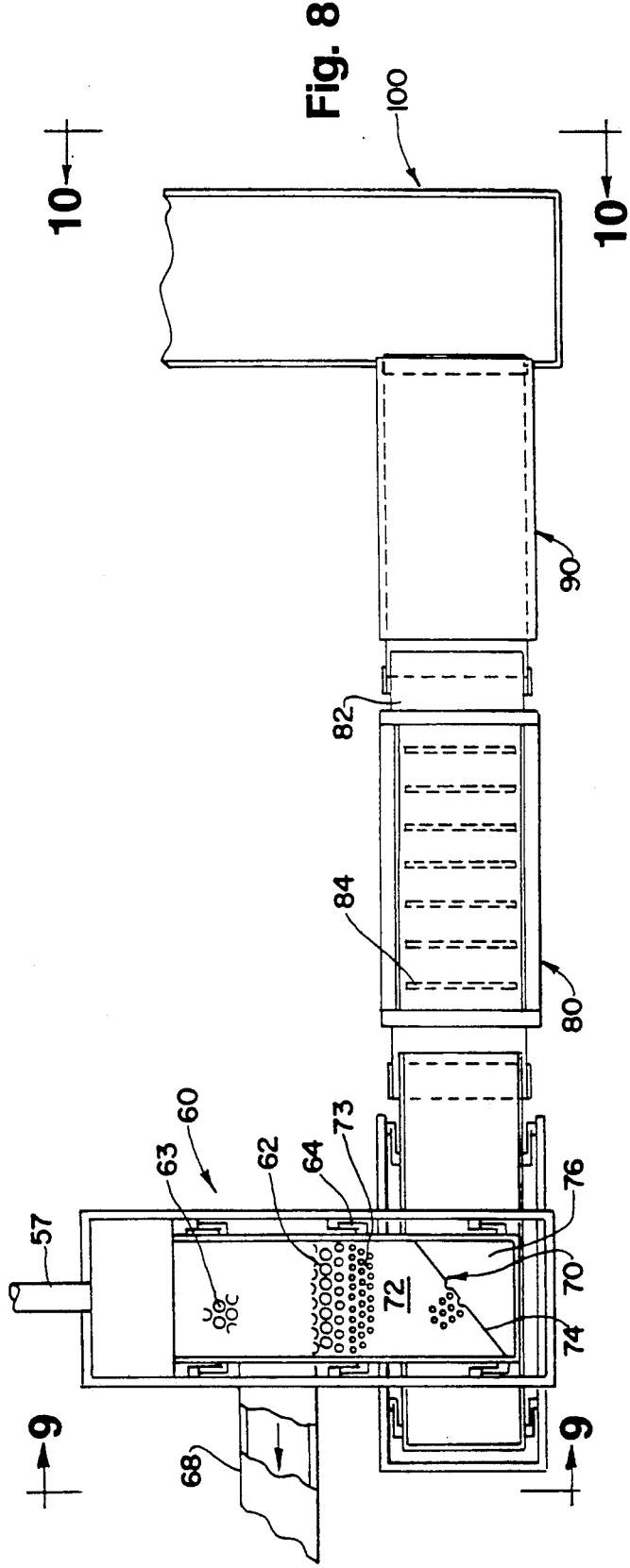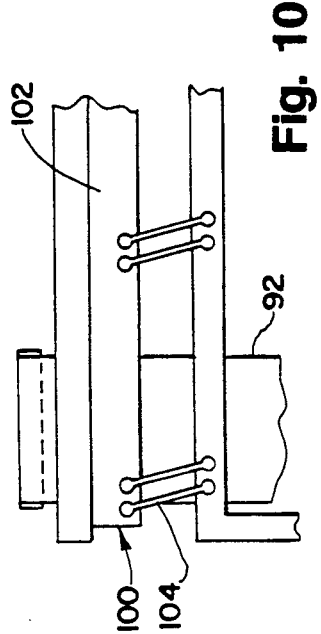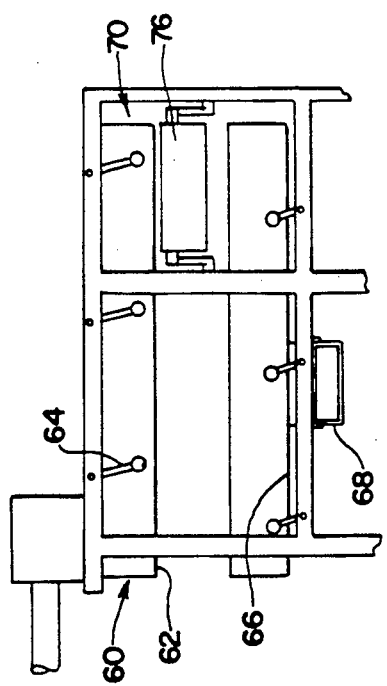

METHOD AND APPARATUS FOR PROCESSING PRODUCE

BACKGROUND OF THE INVENTION

This invention relates to a method and apparatus for processing vegetables, fruits, and produce in general. The operations include storage, cleaning, slicing, cooling, dewatering, and drying of the product for shipment and further commercial use, such as in salads.

The rise of fast food chains and consumers' desire for salads, salad bars and salad ingredients prepared in advance have required the production of large quantities of individual vegetables, fruits, and the like for shipment to particular outlets for subsequent commercial preparation. Numerous problems exist in the prior art which result in slow production at the plant, poor appearance and taste of the product, high bacteria count, and poor shelf life because of improper cooling or handling.

One problem resides in the initial cleaning of the vegetables. Typical prior art devices use brush washers that can bruise the vegetables, which in turn allows water to bleed out. This results in poor appearance and shelf life.

Slow production can occur from a clogged slicer. This situation can arise, for example, when a trimming table is improperly controlled so that an excess quantity of vegetables reaches the slicer at one instant. Alternatively, improperly trimmed vegetables can require an inordinate amount of sorting at the packing step of the operation.

Once the vegetables are sliced, they must be cooled and dried for packing. Existing methods of accomplishing this include pumping the vegetables with chilled, chlorinated water, in a slurry through a long pipe until the vegetables have had an adequate dwell time to achieve the proper cooling and chlorination treatment. The pressure from the pumping frequently damages the vegetables, especially delicate ones such as thin cucumber slices. The pumping often blows out seed sacks of the cucumbers, resulting in either diminished quality of the shipped product or additional labor costs in inspecting and removing the damaged product before packing.

Another method of cooling and cleaning involves running the vegetables through an open flume. Typically the dwell time in these flumes is not adequate to chill the vegetables, a step necessary to help properly kill bacteria. Also, as the vegetables are lifted from the flume they pass through a top layer of dirt, bacteria, and scum that accumulates at the surface of the water. Thus, undesirable germs and particles can adhere to the vegetables as they are transported through the process.

Current drying devices are large, basket-type centrifuges that force the water through the outer screens of the basket as the centrifuge spins. The centrifugal force necessary to cast water from the surface of the product also damages interior cells. The additional water lost by the damaged cells from the centrifuge process often results in a product with a limp appearance and texture, characteristics which are undesirable to the end user. The loss of water can also result in a less palatable product.

Yet another problem in processing vegetables results from the ambient air temperature in which the processing occurs. Despite the use of chilled water or other means to cool the products, frequently the final temperature of the processed and packed product is undesirably high, further effecting the appearance and shelf life of the shipped product.

Another problem is the chill damage that can occur to vegetables during initial storage. For example, a supplier may prepare and sell cucumbers, peppers, and radishes to a distributor. Cucumbers and green peppers have an optimum storage temperature of about 45 degrees, approximately ten degrees warmer than radishes. The undesirable alternatives for storage require either an improper storage temperature for certain items or two separate storage and refrigeration mechanisms.

SUMMARY OF THE INVENTION

It is the object of the present invention to eliminate the existing problems in processing produce. It is a further object to increase the yield of the process while improving the taste, color, texture, and general appearance of the produce.

The method and apparatus of the present invention include means for washing vegetables, such as nozzles, that spray chilled, chlorinated water at high pressure. A trimming table includes a conveyor for advancing the vegetables to a means for slicing the vegetables, such as a slicing machine. A means for elevating the sliced vegetables, such as a conveyor with cleats, raises the vegetables to a hopper where they are mixed with a chilled liquid such as water. An unpressurized pipe subject to gravity flow transports the vegetables and water from the hopper for a suitable length to cool the vegetables.

A means for separating the water from the vegetables, such as a shaker table with a screened bottom, advances the vegetables to a means for drying the vegetables with forced air, which can be embodied by air knives, a fluidizing bed, or both.

The present invention eliminates the chill damage that occurs in storage. The storage area is placed adjacent to the processing area for economy of space. The product requiring the coldest storage is placed near the actual refrigeration vent or unit. Another area is partitioned but not insulated from the coldest area, so that some but not all of the cooling effect is transmitted.

The high pressure spray cleaning of the produce eliminates the problems created by brush washers. The trimming table helps to eliminate problems associated with production pacing and slicer clogging, especially when an over-under parallel conveyor system is used, with the lower conveyor used for moving the produce requiring trimming and handling and the upper conveyor moving the trimmed produce toward the slicer.

Problems with pumping and flume systems used for cooling are eliminated by transporting the vegetables and chilled water by gravity through pipes of an adequate length to permit the proper dwell time for cooling. The damage caused by centrifuges is eliminated by air drying, so the produce remains crispier. The elimination of the centrifuge also permits processing on a continuous basis rather than by batches, thus speeding the entire process. Moreover, the elimination of the centrifuge saves labor by eliminating steps such as rehydrating peppers and removes a breeding ground for bacteria.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

FIG. 3 is a cross section elevation view of the high pressure spray and mesh belt for washing the produce;

FIG. 4 is a cross section elevation view of the trimming table with upper and lower conveyors;

FIG. 5 is a cross section elevation view of the cleated upper conveyor on the trimming table dropping produce into the slicer;

FIG. 6 is a cross section elevation of the top of the elevator conveyor depositing produce into the hopper that also receives chilled water;

FIG. 8 is a plan view of the portion of the apparatus for the dewatering, drying, inspecting, and packing operations;

FIG. 9 is an elevation view of the shaker tables used for dewatering;

FIG. 10 is an elevation of a portion of the inspection and packing table;

DESCRIPTION OF THE PREFERRED EMBODIMENTS

Figure 1:
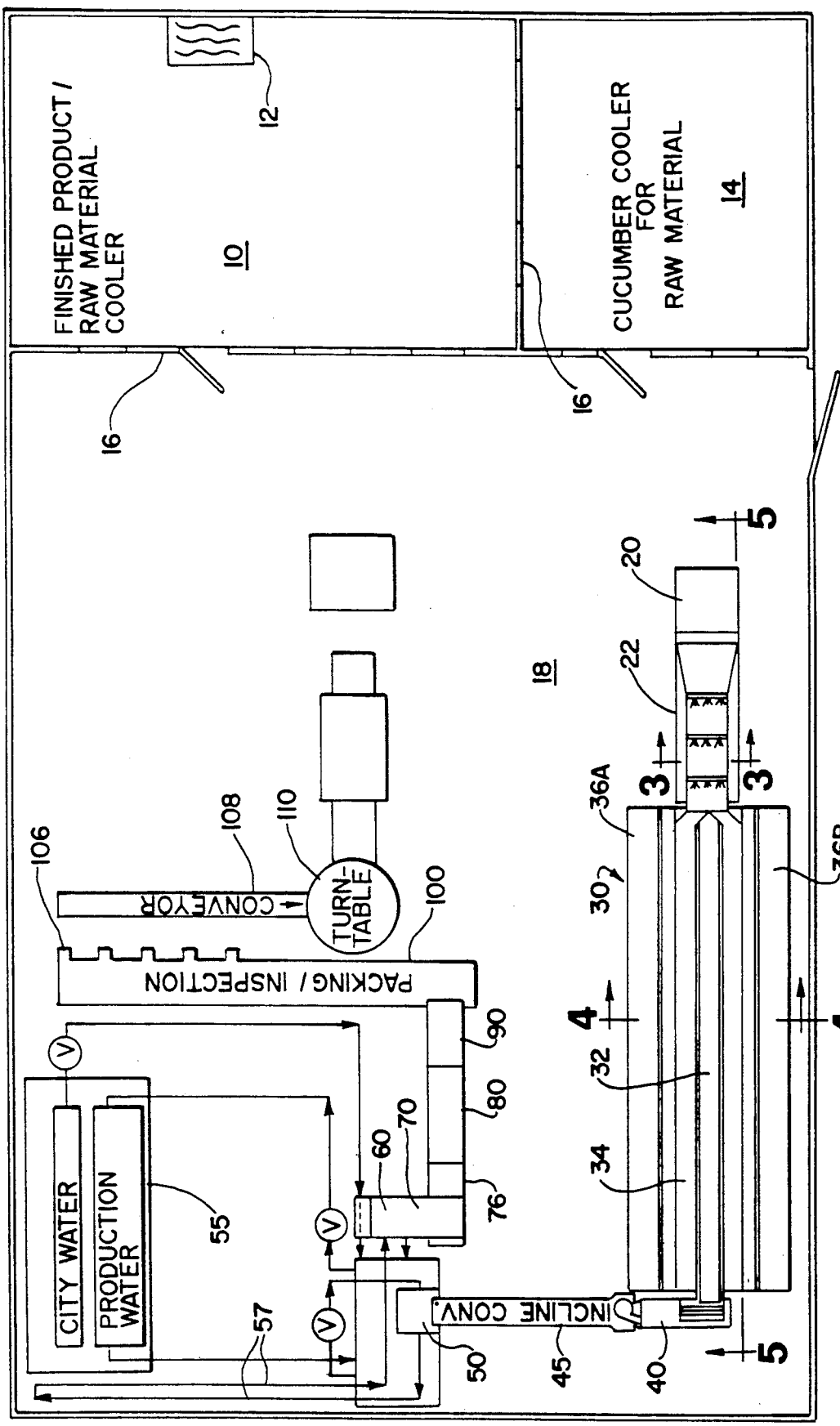
FIG. 1 is a plan view of the equipment and storage area.
Figure 2:
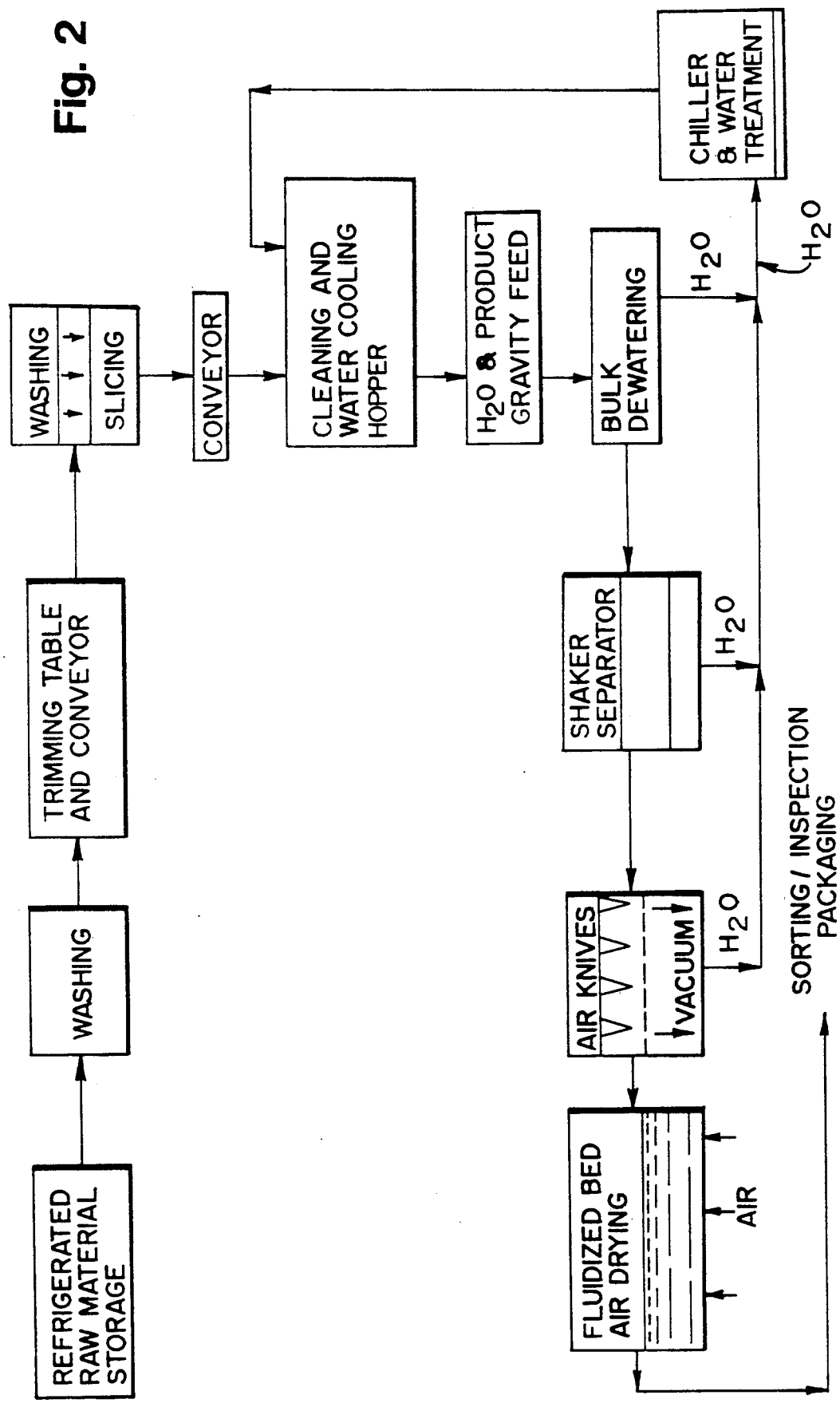
FIG. 2 is a schematic flow chart of the process.

A general description of the preferred method and apparatus of the present invention will be given with respect to FIGS. 1 and 2. As an example, the description will relate to cucumbers and peppers, which have a preferred storage temperature of 45 degrees, and radishes, which have a preferred storage temperature of 35 degrees.

The unprocessed radishes are stored at 35 degrees in cooler 10. Cooling is provided by refrigeration unit 12. Cucumbers and peppers are stored in cooler 14, which is separated from cooler 10 by partition 16, which is a series of floor to ceiling lengths of adjacent vinyl strips. The strips permit easy employee access between coolers and also allow for the controlled transfer of cool air. The partition also creates the desired temperature gradient, so that the cucumbers and peppers remain at 45 degrees and undamaged by chill, while the radishes in cooler 10 are optimally preserved at 35 degrees.

Work area 18 is cooled to approximately 37 or 38 degrees, which is approximately the desired temperature of the processed vegetables. The coolers 10 and 14 are connected to work area 18 also by a series of flexible vinyl strips 16. Only one product at a time is processed, and it is staged on staging table 20. The vegetables are then placed on washing means 22, as shown in FIG. 3. The vegetables move along stainless steel mesh belt 24 of conveyor 25, under nozzles 26. The nozzles 26 spray chlorinated water at a pressure of 50 psi, with the chlorine count preferably 150 parts per million. The mesh belt 24 permits drainage of the water into the bottom 28 of washing means 22. Disposal or recirculation and reuse of the water can be accomplished as desired. The water passing through nozzles 26 should be chilled to at or near the desired storage temperature of the vegetable. Otherwise, if the incoming water comes directly from the public water supply, the water will be too warm and raise the temperature of the product. The washing means 22 was designed by Procon Systems, Inc.

The conveyor 25 moves the vegetables onto trimming table 30 (FIG. 4). The table 30 has an upper conveyor 32 and a lower conveyor 34. The vegetables are moved directly from the washer conveyor 25 to lower trimming conveyor 34. Both conveyors, 32 and 34, are independently controlled by traditional electromechanical means. The vegetables are conveyed along the length of the lower conveyor to distribute them for a number of trimming personnel, who stand at cutting shelves 36A and 36B. The trimming personnel perform the necessary hand operations of cutting off the end of radishes, cleaning seeds out of peppers, and the like. Once the vegetables are cleaned and ready for slicing they are placed on upper conveyor 32, which carries the vegetables and deposits them in slicer 40 (FIG. 5). In the preferred embodiment, upper conveyor 32 includes evenly spaced cleats 33. The cleats 33 are useful in moving the vegetables in relatively constant quantities to slicer 40. In a particular preferred embodiment, the cleats 33 are spaced relatively closely so that cucumbers are properly oriented when they are dropped into slicer 40. To maintain the proper temperature and bacteria level, the slicing operation also ideally includes a washing operation. FIG. 5 depicts a sprayer 42 spraying chilled, chlorinated water on the vegetables as they fall into slicer 40.

Figure 7:
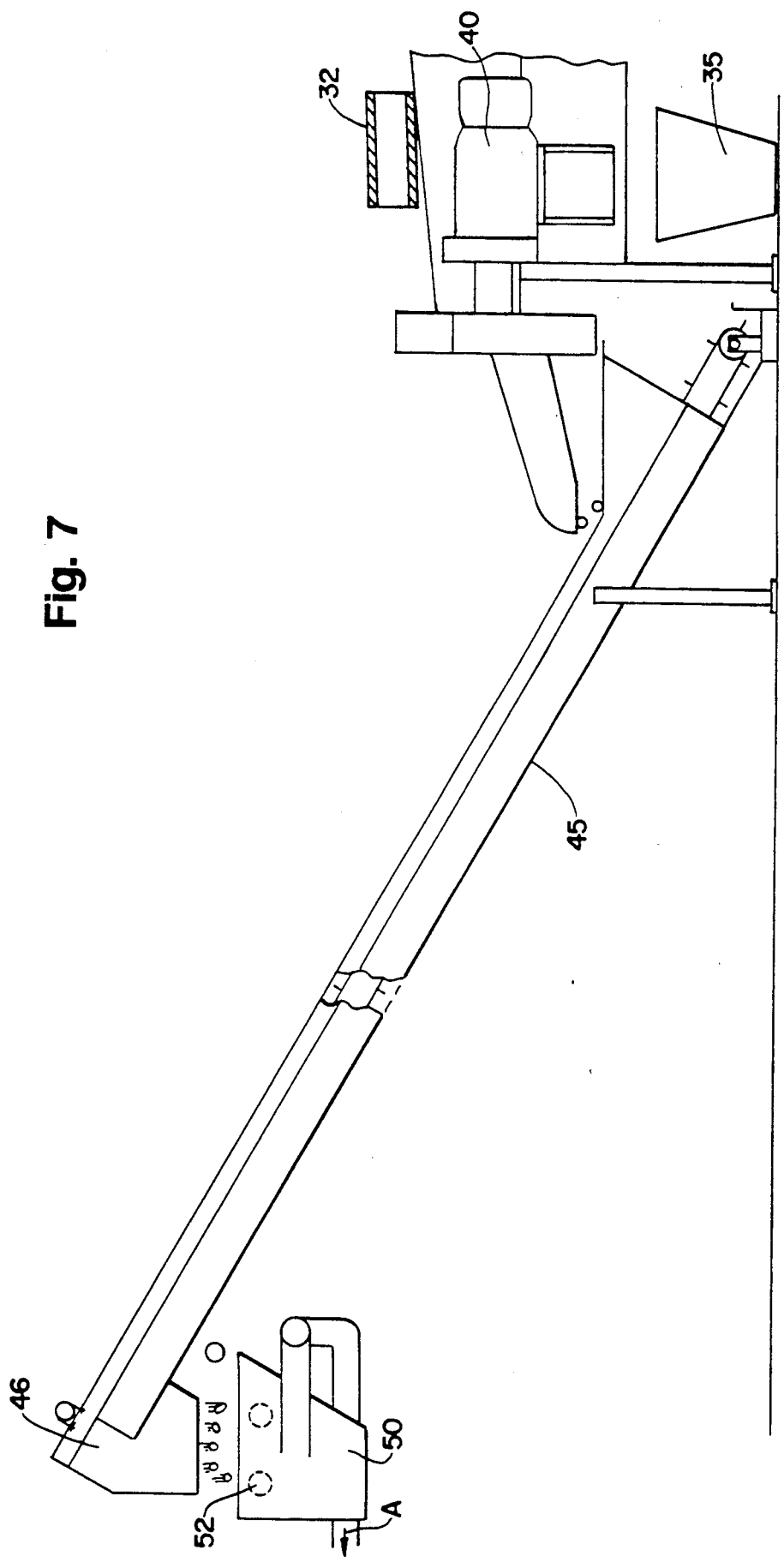
FIG. 7 is a cross section elevation view of the elevator conveyor.

In the preferred system, the end of upper conveyor 32 extends beyond that of lower conveyor 34. With this configuration it becomes possible to dump the waste trimmings off lower conveyor 34 into a trash receptacle 35 (FIG. 7). At the same point, the sliced vegetables exit slicer 40 onto elevator conveyor 45. Elevator conveyor 45 raises the level of the sliced vegetables so that they can be bathed in a gravity flow of chilled water to ensure that the vegetables are cooled to the desired temperature for packing and shipping. The water can, of course, also be treated with chlorine or other antibacterial agents.

The cooling of the sliced vegetables is accomplished by mixing the vegetables and the chilled water and then permitting the mixture to flow downwardly by gravity through pipes so that the vegetables are immersed in the chilled water for an adequate period of time. The vegetables reach the head 46 of conveyor 45 and fall into hopper 50. Hopper 50 is continuously filled with chilled, chlorinated water from a processing unit 55 that takes return water from the system and filters, chills and chlorinates it, and pumps it back to hopper 50. Small amounts of water that are lost can be replaced by any supply source, such as a public utility, but must first be fed to the processor 55 for cooling. The processor 55 can also be used to supply chilled, chlorinated water to the initial washing process and the spraying that accompanies the slicing. The temperature of the water in the processor is ideally maintained at 35 degrees.

Because hopper 50 is filled with water, no damage occurs when the vegetables fall from conveyor 45. The supply of water through pipes 52 is continuous, so as water is provided to hopper 50, an unpressurized slurry-like flow of water and vegetables exits hopper 50, as shown by arrow A. The mixture flows through approximately a 100 foot length of 6 inch diameter PVC pipe 57 canted at approximately ⅛ inch per foot. The vegetables and water exit the pipe 57 onto a screen so that the bulk of the water is drained and recirculated into the system. At this point the vegetables are ready for final dewatering and drying.

The vegetables exiting pipe 57 land on dewatering table 60 with top screen 62. The dewatering table 60 pivotably oscillates on arms 64 that are conventionally driven by electromechanical means. The bulk of the water from pipe 57 falls through holes 63 in screen 62. The holes 63 are sized to retain sliced vegetables that are of satisfactory size. Smaller pieces fall through the holes with the water onto a second screen 66. The second screen 66 is much finer than the top screen 62, so that virtually all solid materials are filtered from the water, which ultimately drains into return trough 68, from which the water is rerouted to water processor 55.

A second shaker table 70 is contiguous with dewatering table 60. Shaker screen 72 is similarly contiguous with screen 62 and is covered with holes 73 that preferably are smaller than holes 63. Screen 72 is canted downwardly from the horizontal so that the vegetables will move toward screen edge 74 and fall onto conveyor 76. The oscillatory movement of dewatering table 60 and shaker table 70 spread the sliced vegetables into generally a single layer. Otherwise, if the wet vegetables clump together, not all of the surfaces of the slices will be adequately dried. Ideally, the screens of the dewatering and shaker tables can be easily removed and replaced to adapt to the differently sized slices of the different vegetables. The dewatering table 60 and shaker table 70 were built by the Frank Hamachek Machine Co.

Conveyor 76 is disposed transversely to the dewatering and shaker tables to conserve space and redirect the vegetables toward a first means 80 for drying the vegetables by air. The vegetables fall from the end of conveyor 76 onto absorbent dryer belt 82, which is preferably an absorbent material such as a cloth material. Such cloth material may include cotton, cotton blend or the like. The vegetables on belt 82 move under a series of air jets 84 that blow water off the vegetables. In the preferred embodiment seven air knives are spaced approximately six inches apart linearly.

Water from the moist vegetables is absorbed by belt 82. A fan 86 disposed in plenum or chamber 88 creates a negative pressure under belt 82 so the water is drawn through the bottom of the belt. This suction improves drying and also helps retain the sliced product on the belt. Ideally, the pressure in the air knives is 40 to 50 psi, while a vacuum head of 12 to 15 inches is maintained in plenum 88.

Figure 12:
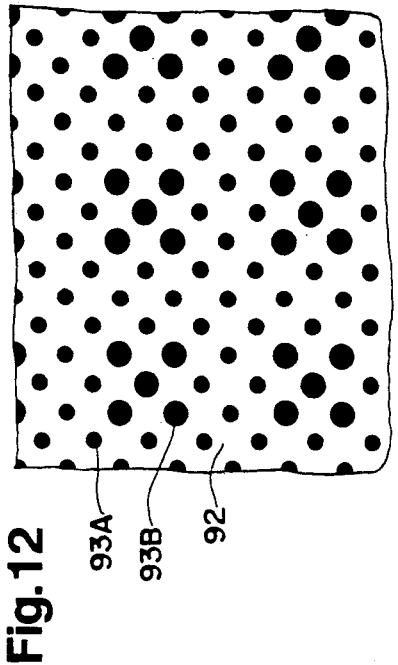
FIG. 12 is a plan view of the perforations in the belt of the second air dryer.
Figure 11:
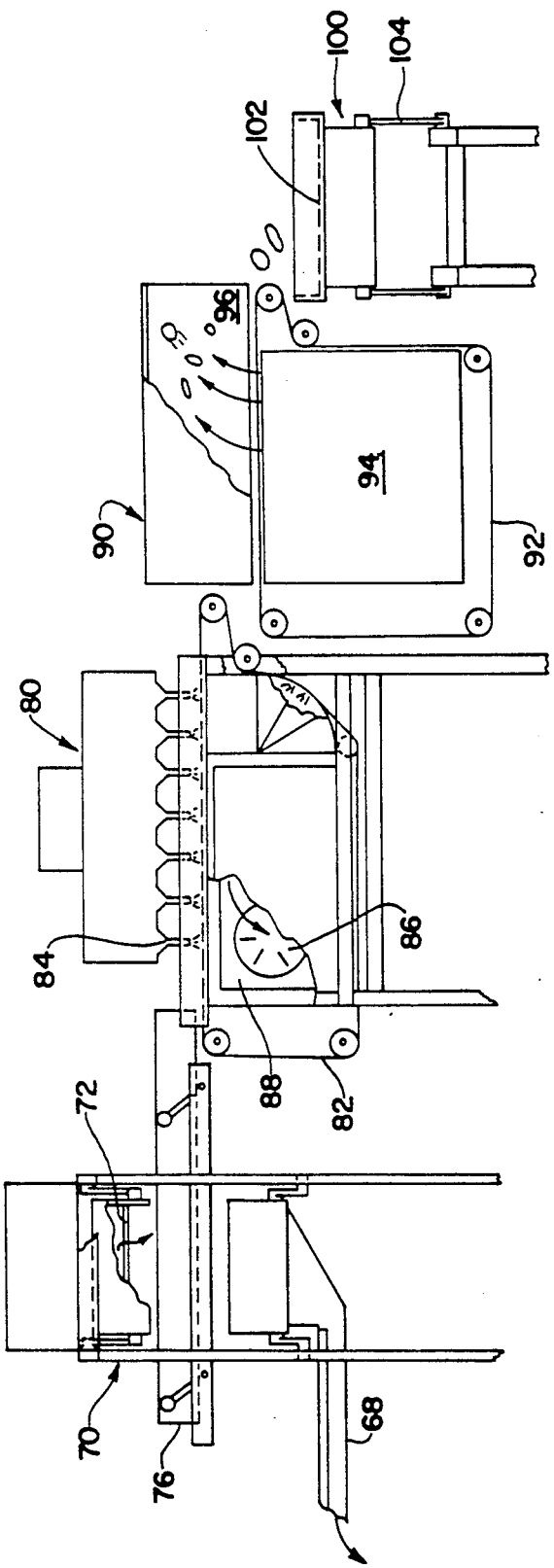
FIG. 11 is an elevation view of the end of the shaker tables, the air knife drying device, the fluidized bed dryer, and the end of the inspection and packing table.

After the product has moved through the first drying means 80, it passes through a second drying means 90. The second drying means behaves like an aerated or fluidized bed. Conveyor belt 92 passes over chamber 94, which has a fan (not shown) that forces air upward through belt 92 into upper chamber 96. Belt 92 is preferably composed of nylon, and possesses a unique pattern of perforations as shown in FIG. 12. This pattern, which is characterized by alternating groups of smaller apertures 93A and larger apertures 93B, assists both the agitation of the vegetables for drying purposes and also the forward motion of the sliced product. Both drying means preferably include air filters (not shown) disposed at the air intakes. The air pressure under belt 92 should preferably be on the order of two to four inches of head. The first drying means 80 and second drying means 90 were also built by the Frank Hamachek Machine Co.

It is necessary that the drying process remove substantially all water from the surface of the processed vegetables, so that the shelf life of the product is maximized and the appearance, taste, and texture are also maintained. It is particularly intended that the cut cells on the surface of the sliced product be dried. Other dryers, such as blowers used to remove excess water from vegetables before entering a freezing tunnel, would be inadequate to dry the sliced products to obtain the results of the present invention.

The dried product exits from the second dryer 90 onto vibratory packing table 100. The top 102 of the table 100 is oscillated by arms 104. The vibration allows the finished product to slide along without clumping. Thus a visual inspection of the finished product can be accomplished with a minimum of handling, which in turn minimizes product damage. FIG. 1 conceptually depicts the preferred equipment layout for packing and inspection. The vibratory table 100 deposits the product at one of five stationary packing tables 106, where an employee packs the product in a bag or tub. A conveyor 108, turntable 110, and other handling equipment can be used to transport the packed and finished product for storage and handling.

Of course, it should be understood that various changes and modifications to the preferred embodiments described herein will be apparent to those skilled in the art. For example, the current design contemplates using the ambient air in work area 18 as the drying air for dryers 80 and 90. Alternatively, refrigerated air from another room could be provided. Another example would be replacing the absorbent dryer belt 82 with a perforated plastic belt so that water could adequately be moved away from the produce and drained. Such changes and modifications can be made without departing from the spirit and scope of the present invention and without diminishing its attendant advantages. It is, therefore, intended that such changes and modifications be covered by the following claims.

What is claimed is:

1. A system for processing fresh produce and the like, comprising, in related order:
    means for washing the produce;
    a trimming table, including a conveyor for advancing the produce;
    means for slicing the produce;
    a supply of cooling liquid;
    means for mixing the sliced produce with said cooling liquid to form a slurry-like mixture;
    means for transporting by gravity flow said cooling liquid with the sliced produce, whereby the sliced produce remains in contact with said cooling liquid for a period of time substantial enough to cool the sliced produce to a desired temperature, said gravity flow transporting means comprising a long, stationary, unpressurized conduit to carry a large volume of said slurry-like mixture of cooling liquid and sliced produce, said conduit being pitched slightly vertically downward to maintain said slurry-like mixture of cooling liquid and produce in a flow at a low velocity to permit cooling of and preventing damage to the sliced produce;
    means for separating said cooling liquid from the sliced produce; and
    means for drying the sliced produce with forced air.

2. The system of claim 1 wherein said means for drying comprises a first dryer with pressurized air directed toward one side of the produce and a moisture remover on the other side of the produce.

3. The system of claim 2 wherein said moisture remover comprises means for creating a vacuum.

4. The system of claim 2 wherein said drying means further comprises a second dryer for transporting and blowing air on the sliced produce.

5. A system for processing produce, comprising, in related order:
   a plurality of cleaning sprayers;
   a conveyor for transporting the produce through said sprayers;
   a trimming table comprising a first conveyor to permit handling of the produce and a second conveyor to transport the produce for slicing;
   means for slicing the produce;
   a conveyor for elevating the sliced produce;
   a supply of cooling fluid;
   means for receiving the sliced produce and said cooling fluid to form a slurry-like mixture;
   means for controlling the temperature of said cooling fluid;
   means for containing and directing said slurry-like mixture of sliced produce and said cooling fluid in an unpressurized flow to cool the sliced produce, said means comprising a long stationary, unpressurized conduit to carry a large volume of said slurry-like mixture, said conduit being pitched slightly vertically downward to maintain said slurry-like mixture of cooling liquid and produce in a flow at a low velocity to permit cooling of and prevent damage to the sliced produce;
   means for separating said cooling fluid from the sliced produce;
   first means for drying the produce comprising oppositely disposed means for supplying positive and negative air pressures; and
   second means for drying the produce comprising a perforated conveyor means for moving the sliced produce through a supply of forced air for dispersing moisture from the produce.

6. The system of claim 5 wherein said second conveyor of said trimming table includes cleats.

7. The system of claim 5 further comprising a shaker table for separating the sliced produce into a generally single layer, said shaker table being positioned in advance of said first drying means.

8. The system of claim 5 further comprising means for storing and cooling the produce, said storage means being located in generally close proximity to said washing means.

9. The system of claim 8 further comprising a partition to create two temperature zones in said storage means, wherein one of said zones is cooled only by the refrigeration of the other of said temperature zones.

10. The system of claim 5 wherein said positive air pressure means is a series of air knives.

11. The system of claim 5 wherein said cleaning sprayers are operatively connected to a source of temperature controlled, chlorinated water.

12. The system of claim 11 wherein said separating means comprises a first screen to separate the sliced produce of desirable size from the liquid and produce portions of undesirable size, and a second screen to separate the liquid from the undersirably sized produce portions.

13. The system of claim 5 further comprising means for recirculating fluid obtained from said separating means and said first drying means.

14. The system of claim 5 further comprising a vibratory table for aiding the inspection and packing of produce and for minimizing human handling of the produce.

15. A method of processing produce, the steps comprising in sequential order:
   washing the produce on a conveyor with a high pressure spray;
   preparing the produce by hand on or in proximity to a first trimming conveyor and transporting the produce for slicing on a second conveyor;
   slicing the produce;
   supplying a fluid for cooling the produce to a desired temperature;
   placing the sliced produce in said fluid to form a slurry-like mixture;
   transporting said slurry-like mixture of fluid and sliced produce by a gravity flow means for a distance substantially long enough to permit cooling of the sliced produce to or near the desire temperature, said means comprising a long stationary, unpressurized conduit to carry a large volume of said slurry-like mixture, said conduit being pitched slightly vertically downward to maintain said slurry-like mixture of cooling liquid and produce in a flow at a low velocity to permit cooling of and prevent damage to the sliced produce;
   separating said fluid and the sliced produce;
   forming the sliced produce into a generally single layer; and
   transporting the sliced produce through moving air to dry the produce.

16. The method of claim 15 further comprising the step of cooling and cleaning said cooling fluid.

17. The method of claim 15 wherein said step of separating the fluid and the sliced produce comprises a first substep of separating the pieces of sliced produce desired for further processing and a second substep of separating remaining undesirable produce portions from the fluid and returning the fluid for cooling and cleaning.

18. The method of claim 15 wherein the step of drying includes transporting the sliced produce between oppositely disposed means for applying positive and negative air pressure.

19. The method of claim 18 further comprising the step of forcing air through a perforated travelling belt to provide additional air drying.

20. The method of claim 15 wherein said high pressure spray is cooled to a temperature at or near the desired storage temperature of the produce.

21. The method of claim 15 further comprising the step of moving the dried sliced produce to a vibratory table to minimize human handling during the inspecting, sorting, and packing of the produce.

22. The method of claim 15 wherein the ambient air is maintained at a temperature near the desired storage temperature of the produce for all of the steps between and including washing and drying.

23. The method of claim 15 further comprising the step of conveying the sliced produce vertically after slicing.

24. The method of claim 23 wherein said cooling is accomplished by transporting the sliced produce by gravity in a cooling fluid for a distance to permit cooling of the produce to or near a desired temperature.

25. A system for processing fresh produce and the like, comprising:
   means for washing the produce;
   a trimming table, including a conveyor for advancing the produce;
   means for slicing the produce;
   a supply of cooling liquid;
   means for mixing the sliced produce with said cooling liquid;
   means for transporting by gravity flow said cooling liquid with the sliced produce whereby the sliced produce remains in contact with said cooling liquid for a period of time substantial enough to cool the sliced produce to a desired temperature;
   means for separating said cooling liquid from the sliced produce; and
   means for drying the produce with forced air, wherein said means for drying comprises a first dryer with pressurized air directed toward one side of the produce and a moisture remover on the other side of the produce, said moisture remover comprising means for creating a vacuum and a water absorbent belt for transporting the produce through said drying means.

26. A method of processing produce, comprising:
   washing the produce on a conveyor with a high pressure spray;
   preparing the produce by h and on or in proximity to a first trimming conveyor and transporting the produce for slicing on a second conveyor;
   slicing the produce,
   placing the sliced produce in a fluid for cooling to a desired temperature;
   transporting the fluid and sliced produce by gravity for a distance substantially long enough to permit cooling of the sliced produce to or near the desired temperature;
   separating the fluid and the sliced produce, wherein said step of separating the fluid and the sliced produce comprises a first substep of separating the pieces of sliced produce desired for further processing and a second substep of separating remaining undesirable produce portions from the fluid and returning the fluid for cooling and cleaning;
   forming the sliced produce into a generally single layer; and
   transporting the sliced produce through moving air on an absorbent belt to dry the produce.

* * * * *